UNITED STATES PATENT OFFICE

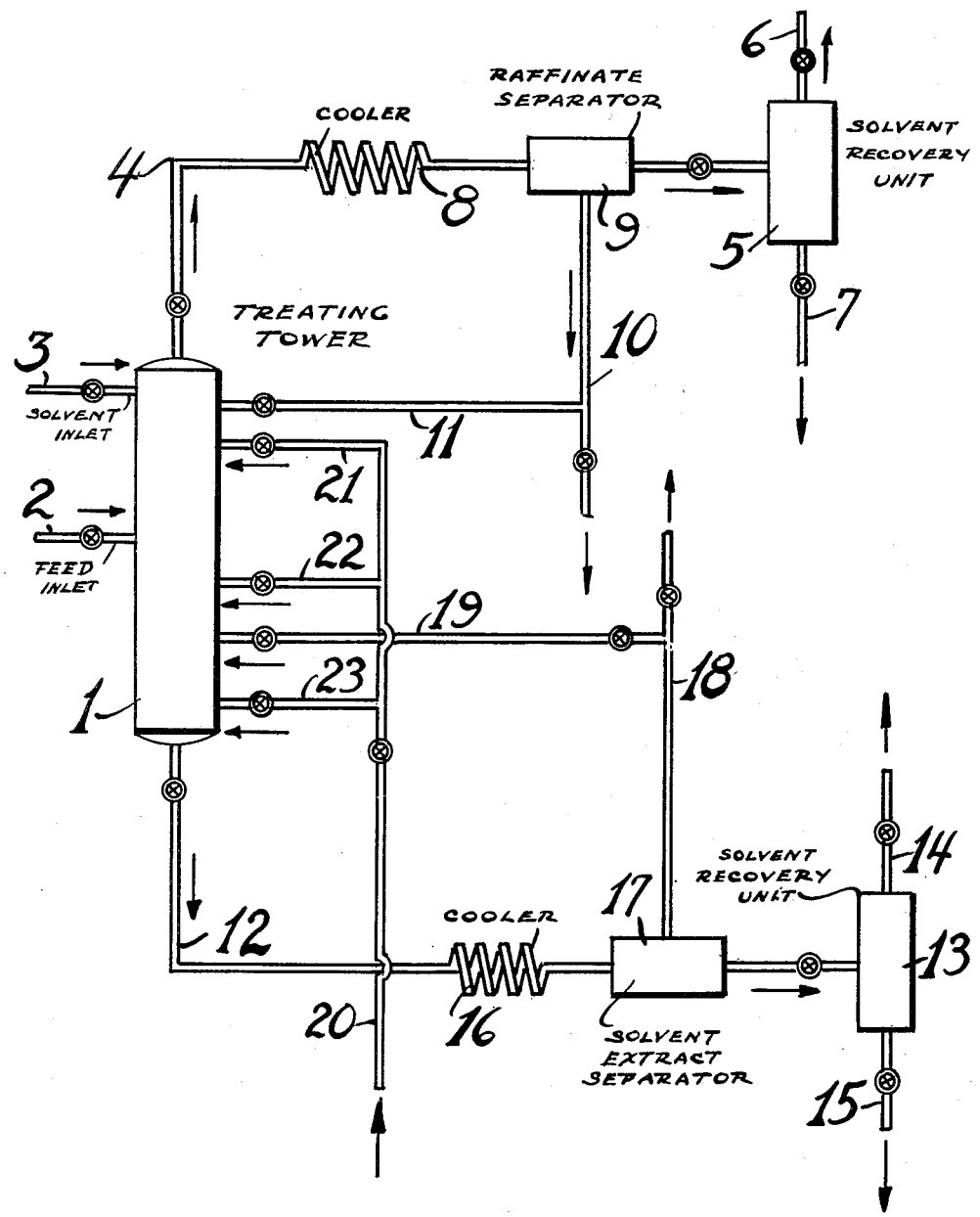

2,225,910
SOLVENT TREATING

George W. Gurd, Sarnia, Ontario, Canada, and Walter N. Munster, Port Huron, Mich., assignors to Standard Oil Development Company, a corporation of Delaware Application January 25, 1940, Serial No. 315,594

8 Claims. (Cl. 196—13)

This invention relates to the treatment of mineral oils with selective solvents. The invention is particularly concerned with the treatment of mineral oils under conditions to segregate the relatively more aromatic constituents from the relatively more paraffinic constituents by utilizing a solvent selected from the class of alkyl aryl sulfonamides.

It is known in the art to treat mineral oils with various selective solvents which have the ability to segregate the relatively more aromatic constituents from the relatively more paraffinic constituents. Solvents usually employed are selected from the class of substances which have a preferential selectivity for the relatively more aromatic type compounds, as for example, phenol, furfural, sulfur dioxide, cresol, nitro benzene, aniline, beta beta dichlor diethyl ether, and the like. Mixtures of these solvents may be employed, as well as other substances such as liquefied normally gaseous hydrocarbons, in combination with the above described class of solvents. The oil and solvent are contacted by various means, as for example, by batch or semi-batch processes. However, the usual method of treating the oil is to contact the oil and solvent in a countercurrent solvent treating tower process. In this operation, the heavier phase, usually the solvent, is introduced at the top of a countercurrent treating tower while the lighter phase, usually the oil, is introduced at the bottom or center section of the countercurrent treating tower. Efficient contact between the countercurrently flowing phases is secured by various distributing and contacting means such as contact masses, distributing plates, pierced plates, and the like. Conditions are maintained in the tower adapted to secure the formation of a relatively solvent poor or raffinate phase highly paraffinic in nature and a solvent rich or solvent extract phase highly aromatic in nature. The respective phases are removed from the tower and the solvent separated from the extract phase and raffinate phase by suitable means, usually by distillation.

We have now discovered a class of solvents which are particularly desirable and effective for segregating mineral oils into their relatively more paraffinic and into their relatively more aromatic fractions. The solvents of our invention are also effective for the segregation of relatively more unsaturated fractions from the relatively more saturated fractions. The solvents of our invention are selected from the class of alkyl aryl sulfonamides, which substances may be represented by the following structural formula:

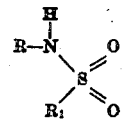

in which R represents an alkyl group and $R_1$ represents an aromatic ring.

The process of our invention may be readily understood by reference to the attached drawing illustrating one modification of the same. A feed oil, which for the purposes of description is taken to be a cracked naphtha boiling in the motor fuel boiling range, is introduced into countercurrent treating tower 1 by means of feed line 2. The oil flows upwardly through tower 1 and contacts downflowing solvent which is introduced into the tower by means of solvent feed line 3. For purposes of description the solvent is taken to be a mixture of ortho and para toluene ethyl sulfonamide. Efficient contact between the countercurrently flowing phases is secured by adequate distributing and contacting means. Temperature and pressure conditions are adapted to secure the formation of a raffinate phase and a solvent extract phase. The raffinate phase is removed from tower 1 by means of line 4 and introduced into solvent recovery unit 5. The solvent is removed from solvent recovery unit 5 by means of line 6, while the solvent-free raffinate is removed by means of line 7. If desired, the raffinate phase may be cooled by means of cooler 8 and passed into raffinate separator 9. The precipitated phase may be withdrawn from solvent separator 9 by means of line 10 and handled in any manner suitable. Under certain conditions it may be desirable to return at least a portion of the precipitated phase to the countercurrent treating tower by means of line 11. The solvent extract phase is withdrawn from tower 1 by means of line 12 and passed to solvent recovery unit 13. The solvent is removed from unit 13 by means of line 14, while the solvent-free extract is removed by means of line 15. The solvent extract phase also may be cooled in cooler 16 and passed to solvent extract separator 17. The precipitated phase may be withdrawn from solvent separator 17 by means of line 18 and treated in a suitable manner. Under certain conditions it may be desirable to return at least a portion of the precipitated phase to tower 1 by means of line 19. The selectivity and solvent power of the selective solvent may be modified to any extent by maintaining a temperature gradient in the tower or by introducing solvent modifying agents at a plurality of stages by means of lines 20, 21, 22, and 23.

The process of the present invention may be widely varied. The solvents are selected from the class of alkyl aryl sulfonamides. Suitable solvents of this class are, for example, phenyl ethyl sulfonamide, mono- and di-hydroxy phenol propyl sulfonamide, propyl benzene butyl sulfonamide, butyl benzene propyl sulfonamide, and the like. Especially desirable solvents are the toluene alkyl sulfonamides, as for example, toluene methyl sulfonamide, toluene propyl sulfonamide, toluene butyl sulfonamide, and toluene hexyl sulfonamide. Preferred toluene alkyl sulfonamide solvents are those in which the alkyl group contains from one to four carbon atoms in the molecule. An especially desirable solvent is a mixture of ortho and para toluene ethyl sulfonamides.

The operating conditions may be widely varied and the extraction operation may be carried out at temperatures in the range from 50° to 300° F. and at normal or elevated pressures. In general, when treating oils boiling in the motor fuel boiling range with ortho and para toluene ethyl sulfonamide, it is preferred that the temperature be in the range from about 60° F. to 150° F. and that the pressure be in the range from 1 atmosphere to 1½ atmospheres. The quantity of solvent used per volume of oil being treated will vary, depending upon the particular oil being treated, the solvent employed, as well as upon the yield and quality of the products desired. The volume generally will vary in the range from 0.2 to 6 volumes of solvent per volume of oil being treated. When treating oils boiling in the motor fuel boiling range and employing ortho and para toluene ethyl sulfonamides, it is preferred that ½ to 3 volumes of solvent be used per volume of oil being treated.

In order to further illustrate the invention, the following examples are given which should not be construed as limiting the invention in any manner whatsoever:

Example 1

A feed oil of the following composition was solvent treated with a mixture of ortho and para toluene ethyl sulfonamide at a temperature of 80° F.:

Feed.—33⅓% benzene, toluene, xylene (1:2:2 proportion)
66⅔% paraffin base stock (fuming sulfuric acid treated naphtha) the product having the following Engler distillation:

Initial boiling point_____ 192° F.
50% distilled_____ 215° F.
Final boiling point_____ 274° F.

The following results were secured:

|  | Feed | Raffinate | Extract |
|---|---|---|---|
| Gravity | 51.6 A. P. I. | 53.9 A. P. I. | Below 0° F. |
| Aniline point | 76.5° F. | 93° F. |  |
| Refractive index | 1.4325 at 20° C. | 1.4261 at 20° C. | 1.4612 at 20° C. |
| Percent aromatics | 33⅓ | 26½ | 66. |
| Yield |  | 82 | 18. |

Example 2

The effectiveness of the solvents of the present invention may be readily seen by the following results secured by treating various portions of an identical feed stock with various solvents:

|  | Toluene ethyl sulfonamide | | | Beta-phenoxy ethyl alcohol | | | Methyl carbitol | | |
|---|---|---|---|---|---|---|---|---|---|
|  | Feed | Raff. | Ext. | Feed | Raff. | Ext. | Feed | Raff. | Ext. |
| Gravity | 54.3 | 56.4 | 43.2 | 54.3 | 56.6 | 47.6 | 54.3 | 56.2 | 45.2 |
| Refractive index | 1.4249 | 1.4196 | 1.4558 | 1.4249 | 1.4192 | 1.4433 | 1.4249 | 1.4200 | 1.4500 |
| Percent aromatics | 25 | 18.8 | 60.0 | 25.0 | 18.6 | 46.0 | 25.0 | 19.5 | 53.5 |
| Yield |  | 85.0 | 15.0 |  | 76.5 | 23.5 |  | 83.8 | 16.2 |

The data indicate that the quality of extract produced by the toluene ethyl sulfonamide extraction is markedly better than that of either of the other two solvents. The raffinate quality of the sulfonamide compares favorably with that of the beta-phenoxy ethyl alcohol and exceeds that of the methyl carbitol. Since larger amounts of paraffinic material appear in the extracts from the solvents exhibiting lower selectivity, the higher total extract yields of the poorer solvents are to be expected. It should be noted that the higher extract yields of the carbitol and beta-phenoxy alcohol should not be construed as reflecting unfavorably upon the sulfonamide. It also should be noted that the extraction with the sulfonamide was carried out at 80° F., whereas the other two extractions were conducted at 60° F. Since these three solvents behave in the customary manner with respect to temperature, that is, the quality of extract decreases with increase in temperature, the degree of superiority of the sulfonamide is greater than indicated.

The process of the present invention is not to be limited by any theory or mode of operation, but only in and by the following claims in which it is desired to claim all novelty in so far as the prior art permits.

We claim:

1. Process for the segregation of a mineral oil into relatively more aromatic and into relatively more paraffinic constituents, comprising treating said mineral oil with a solvent selected from the class of alkyl aryl sulfonamides under conditions to form a raffinate phase and a solvent extract phase, separating the respective phases and removing the solvent therefrom.

2. Process in acordance with claim 1 in which the alkyl group of said sulfonamide contains from one to four carbon atoms in the molecule.

3. Process for the segregation of a mineral oil into relatively more aromatic and into relatively more paraffinic constituents, comprising treating said mineral oil with a solvent selected from the class of toluene alkyl sulfonamides under conditions to form a raffinate phase and a solvent extract phase, separating the respective phases and removing the solvent therefrom.

4. Process in accordance with claim 3 in which said solvent is para toluene ethyl sulfonamide.

5. Process in accordance with claim 3 in which said solvent is a mixture of ortho and para toluene ethyl sulfonamides.

6. Process for the segregation of petroleum oils boiling in the motor fuel boiling range into relatively more aromatic and into relatively more paraffinic constituents, comprising treating said oil with a solvent selected from the class of alkyl aryl sulfonamides.

7. Process in accordance with claim 6 in which said solvent is selected from the class of toluene alkyl sulfonamides.

8. Process in accordance with claim 6 in which said solvent comprises essentially a mixture of ortho and para toluene ethyl sulfonamides.

GEORGE W. GURD.
WALTER N. MUNSTER.